UNITED STATES PATENT OFFICE.

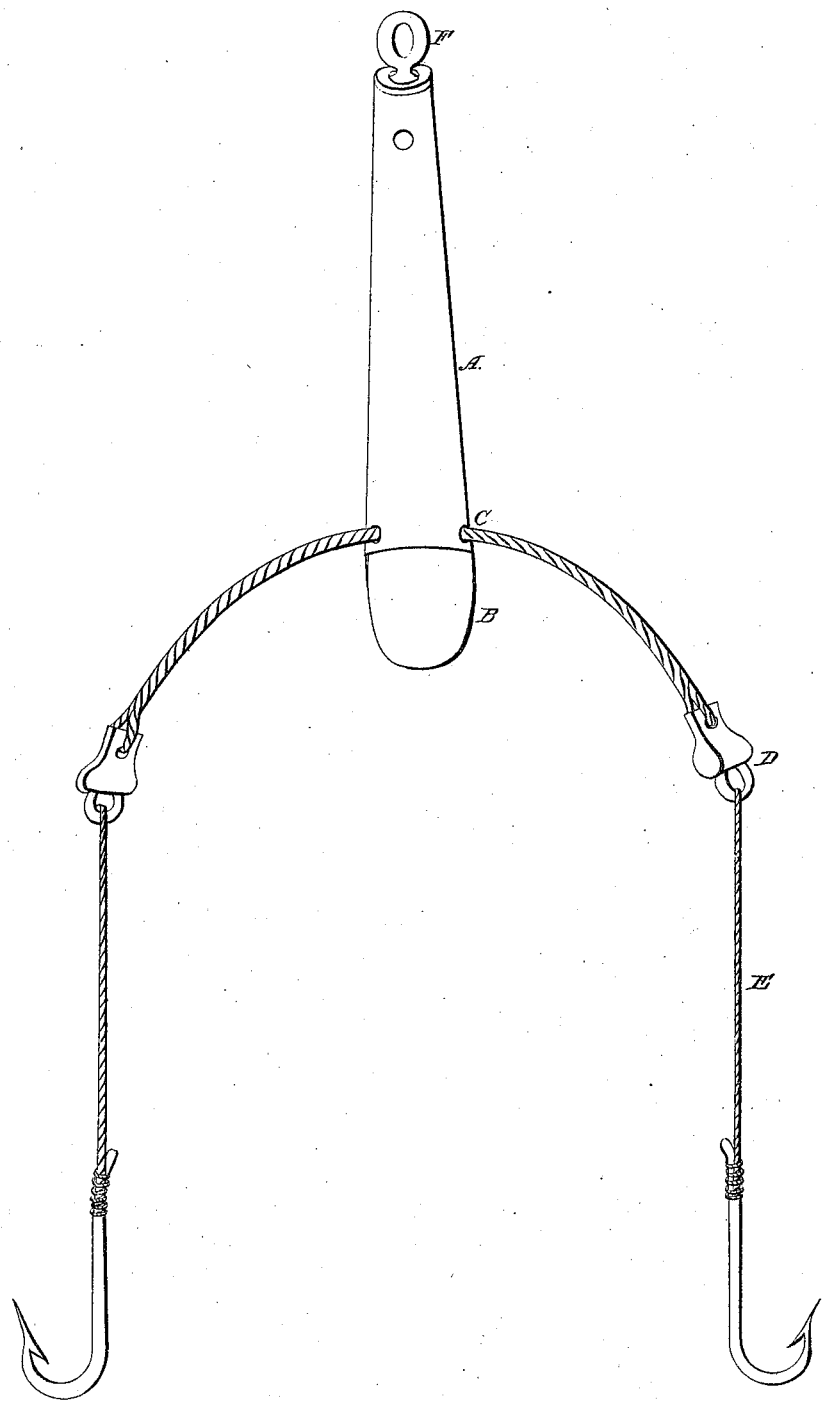

WOOSTER SMITH, OF SOUTH THOMASTON, MAINE.

FISHING-LEAD.

Specification forming part of Letters Patent No. 14,587, dated April 1, 1856.

*To all whom it may concern:*

Be it known that I, the above-named WOOSTER SMITH, of South Thomaston, in the county of Lincoln and State of Maine, and a native-born citizen of the United States, have invented a new and Improved Lead and apparatus connected therewith for sinking and using same for fishing-hooks for cod-fish, halibut, and other sea-fishing; and I do declare that the following is a full, clear, and exact description of the construction and operation of the same, reference being had to the accompanying drawing, and to the letters of reference thereon marked, making a part of this specification, and for which I hereby claim Letters Patent.

The lead aforesaid consists of a round oblong piece of lead from two to five pounds in weight, as may be wanted for deep or shoal water, shaped as represented by that part of the drawing marked A, with a swivel at the top marked F, to prevent the line attached to the same from twisting as the lead descends or as the fish are drawn up, and at the lower or descending end of said lead, and making a part of the same, is a cap made of brass, cast-iron, or other solid metal which cannot be easily bruised or battered by striking the rocks at the bottom in fishing, which is represented in said drawing and marked B, and through the said lower end of said lead and near the cap is a hole, through which the large double line marked C, called by fishermen the "horse-line," runs, about a foot long, to the ends of which brass, iron, or some other metal swivels, marked D, are attached, and to the rings of the swivels are attached the smaller lines, to which the fishing-hooks are fastened, marked E.

The advantage of said cap, besides the injury done to the lead in preventing its getting battered up at the end, as aforesaid, is that this, with said cap, does not become enlarged at the lower end, whereas the one in common use, made all of lead, becomes enlarged by the constant battering, and causes it to catch in the crevices of the rocks, and thus parts the fishing-line, losing lead, hooks, and all; also, with said cap the lead is always kept smooth and in good shape to go through the water the more easily, which will enable it to go through the water to the bottom at least one-eighth quicker than the one of common use, after it has been used a month or two, of the same weight.

The small swivels attached to the horse-line prevent the lines attached getting entangled as they go down, and more especially in coming up with a fish on the hook, which causes fishermen much trouble with the old mode of fastening said small lines to said horse-line.

The shape of the lead herein described is claimed to be a great improvement upon the old form of making fishing-leads, as well as the apparatus connected with it.

The old lead and apparatus used with it, which has long been and is now in common use, consisted of a piece of round oblong lead, smaller at the top than bottom, with the long main line tied into the top by the line passing through a hole in the top part of the lead, or else tied to a loop of leather passed through said hole, and the horse-line fastened in a similar way at the bottom end, and then the small lines to which the hooks are attached are tied to said horse-line.

What I claim as my invention and improvement, and desire to secure by Letters Patent, is—

The improved shape of my lead, the improved mode of fastening the long part of the fish-line to the swivel in the top of the lead, the cap of brass, iron, or other hard metal on the bottom or descending end of the lead, the horse-line running through the lead at the bottom end, the swivels and rings attached to the ends of said horse-line, to which rings of the swivels the small lines to which the hooks are fastened are attached, and said swivel in the top of said lead to which said long part of the fish-line is fastened, as aforesaid.

WOOSTER SMITH.

Attest:
L. W. HOWES,
DAVID V. SMITH.